United States Patent
McGrath

(10) Patent No.: US 6,770,194 B1
(45) Date of Patent: Aug. 3, 2004

(54) WATER OVERFLOW DEVICE AND WATER RETURN DEVICE

(75) Inventor: Roger W. McGrath, Simi Valley, CA (US)

(73) Assignee: Aquaria, Inc., Moorpark, CA (US)

( * ) Notice: Subject to any disclaimer, the term of this patent is extended or adjusted under 35 U.S.C. 154(b) by 42 days.

(21) Appl. No.: 10/340,224

(22) Filed: Jan. 10, 2003

(51) Int. Cl.[7] .................. A01K 63/04; B01D 29/00; B01D 35/01
(52) U.S. Cl. ............. 210/169; 210/258; 210/416.1; 210/416.2; 210/418; 119/259; 137/395
(58) Field of Search .................. 210/169, 241, 210/258, 259, 416.1, 416.2, 418; 119/259; 137/395, 590, 591

(56) References Cited

U.S. PATENT DOCUMENTS

| | | | | |
|---|---|---|---|---|
| 3,080,060 A | * | 3/1963 | Blumenkranz et al. | 210/169 |
| 3,268,079 A | * | 8/1966 | Sharrow, Jr. | 210/169 |
| 4,684,462 A | | 8/1987 | Augustyniak | |
| 5,562,821 A | * | 10/1996 | Gutierrez-Collazo | 210/169 |
| 5,626,747 A | | 5/1997 | Ritzow et al. | |
| 5,665,227 A | * | 9/1997 | Watt | 210/169 |
| 5,814,213 A | * | 9/1998 | Glasgow | 210/104 |
| 5,942,105 A | * | 8/1999 | Leis | 210/129 |
| 6,056,886 A | * | 5/2000 | Hickok et al. | 210/776 |

* cited by examiner

Primary Examiner—Fred G. Prince
(74) Attorney, Agent, or Firm—Pillsbury Winthrop LLP

(57) ABSTRACT

A system for circulating water between a container and an external system in such a way as to maintain a desired water level in the container may include, an overflow assembly and a return assembly. The overflow and return assemblies are generally tubular structures, each of which includes a pair of concentric tubes. The overflow assembly typically includes a skimmer and a silent overflow device towards its upper portion, as well as a strainer towards its lower portion, wherein water is taken out of the container through the skimmer and/or the strainer. The return assembly typically comprises an upper capped diffuser and a lower diffuser, wherein the former allows for water to exit into an tipper portion of the container and the latter provides for water inflow at a lower portion of the container. Both assemblies are installed inside the container by attaching to a lower wall of the container.

55 Claims, 10 Drawing Sheets

US 6,770,194 B1

WATER OVERFLOW DEVICE AND WATER RETURN DEVICE

FIELD OF INVENTION

The present invention is directed to systems for controlling water circulation between a container and an external system and, more particularly, to devices for removing and transferring water from the container to the external system, and returning water from the external system to the container so as to maintain a desired water level in the container.

BACKGROUND

Overflow/water level control systems are typically used for controlling the circulation of water through, as well as the level of water in, a container, such as an aquarium, to which water is added continuously or periodically. In general, means are provided for continually removing water from the container, routing the removed water to an external filter assembly, and then returning the filtered water to the container, while regulating the rates of water removal and return as a means of controlling water level in the container.

Traditionally, this has been achieved by using a hanging-type skimmer box assembly whereby water is skimmed from the surface of the body of water in the container. The basic structure of a skimmer box assembly typically includes an inlet tank, a siphon tube, and an outlet tank, normally with the inlet tank attached to the outlet tank with some means. The skimmer box assembly is mounted on the frame of the container, with the inlet tank partly immersed in the body of water within the container.

In the case of an aquarium, water is pumped into the aquarium from a filtration system located below or behind the aquarium. The water level in the aquarium rises and water from the aquarium flows into the inlet tank. The water level in the inlet tank rises, creating a differential pressure between the inlet tank and outlet tank and forcing water through the siphon tube into the outlet tank on the outside of the aquarium. The outlet tank typically has some means of maintaining a selected water level combined with a means for draining water out of the outlet tank and into the filtration system.

Systems of the type described above usually prove to be quite inflexible. For example, the hang-on tanks or similar devices often prevent placement of the aquarium close to walls. As such, installation of the entire aquarium system is not a simple matter of choice, but is hampered by physical limitations. In addition, users generally find the hang-on devices to be objectionable in appearance, as well as difficult to service. Moreover, depending on the size of the tank, traditional overflow/water level control systems can be quite large. As such, they obstruct a considerable portion of the inner space of the aquarium. Therefore, water circulation and water level control systems are needed that address these shortcomings.

DETAILED DESCRIPTION

Figure 1:
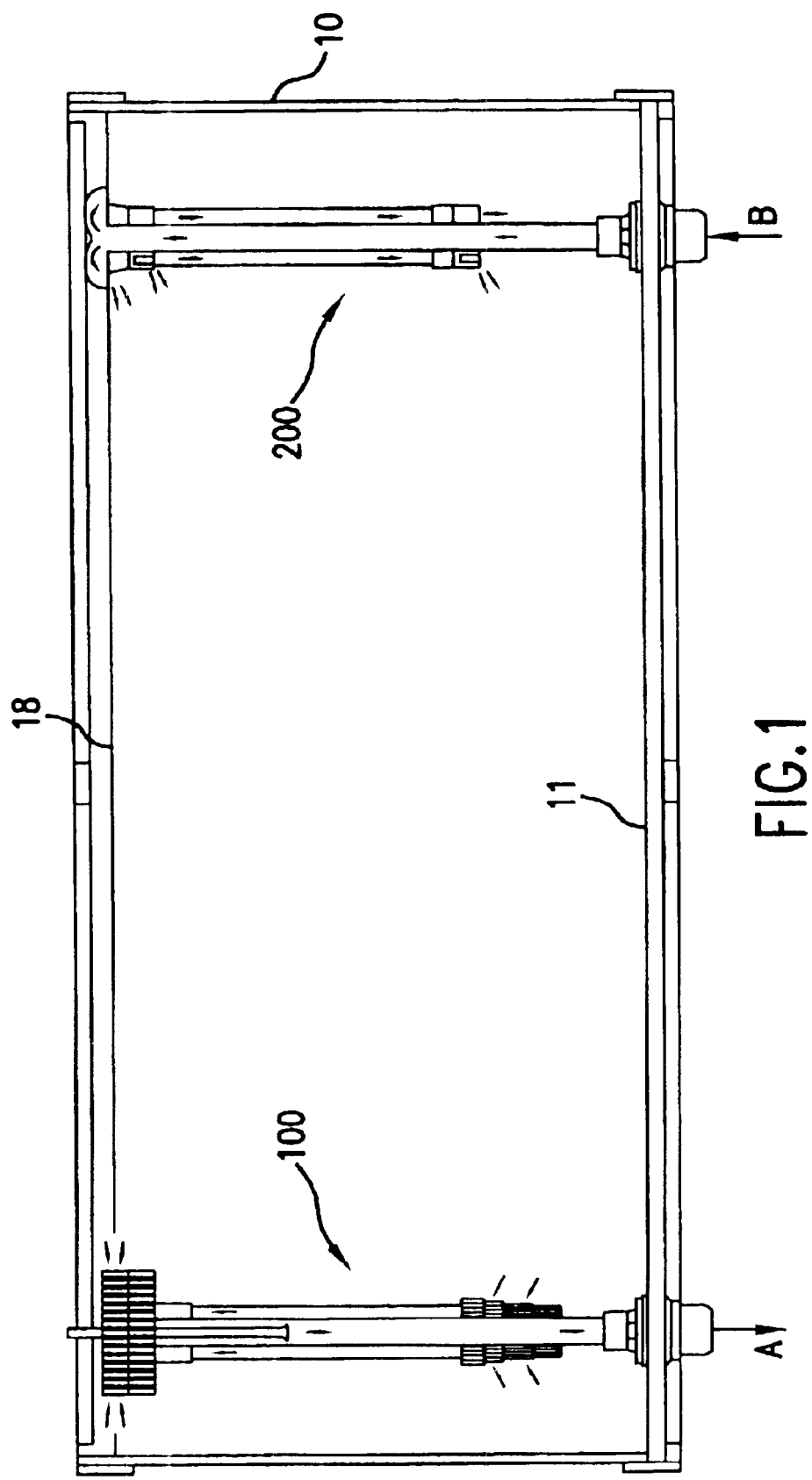
FIG. 1 shows overflow and return assemblies according to an embodiment of the invention.

Embodiments of the present invention are directed to a device for removing water from a container, comprising:

a first tube located within the container and defining an outlet opening at an upper end thereof and an inlet opening at a lower end thereof;

a second tube disposed substantially coaxially within the first tube and defining an inlet opening at an upper end thereof, an outlet opening at a lower end thereof, and an outflow path through the second tube's outlet opening via which water flows downwardly out of the container;

an overflow skimmer removably coupled to the upper ends of said first and second tubes;

a transverse flange disposed coaxially within the skimmer;

a cap overlying the flange so as to define with said flange a first annular flow path via which water flows to the inlet opening of the second tube;

a vent tube extending vertically downwardly through said cap, transverse flange, and skimmer and into said second tube; and a strainer coupled to the inlet opening of the first tube and having a lower end that is disposed around the periphery of the second tube;

wherein the inside surface of the first tube and the outside periphery of the second tube define a second annular path therebetween through which water flows upwardly and towards the first annular flow path.

In another embodiment, the instant invention is directed to a device for transferring water to a container from an external system, wherein the device comprises:

a first tube located within the container and defining an inlet opening at an upper end thereof and an outlet opening at a lower end thereof;

a second tube disposed substantially coaxially within the first tube and defining an outlet opening at an upper end thereof, an inlet opening at a lower end thereof, and an inflow path through said second tube's inlet opening via which water flows upwardly into the container;

a first diffuser coaxially mounted on the upper end of said first tube and including upper and lower radial openings for directing water into an upper portion of the container;

a second diffuser coupled to said lower end of the first tube and including side and bottom openings for directing water into a middle or lower portion of the container; and a diffuser cap releasably coupled to the first diffuser so as to define with the first diffuser a compartment from which water is distributed into the container via said first and second diffusers, wherein the inside surface of the first tube and the outside periphery of the second tube define an annular flow path therebetween through which water flows downwardly from said compartment and towards the second diffuser.

In alternative embodiments, the present invention is also directed to a device for circulating water between a container and an external system so as to maintain a desired water level in the container, wherein the device comprises:

(a) an overflow assembly comprising:
   a first outer tube located within the container and defining an outlet opening at an upper end thereof and an inlet opening at a lower end thereof;
   a first inner tube disposed substantially coaxially within the first outer tube and defining an inlet opening at an upper end thereof, an outlet opening at a lower end thereof, and an outflow path through the first inner tube's outlet opening via which water flows downwardly out of the container and to the external system;
   an overflow skimmer removably coupled to the upper ends of said first inner and outer tubes;
   a vent tube extending vertically downwardly through said skimmer and into said first inner tube; and
   a strainer coupled to the inlet opening of the first outer tube and having a lower end that is disposed around the periphery of the first inner tube; and (b) a return assembly comprising:
   a second outer tube located within the container and defining an inlet opening at an upper end thereof and an outlet opening at a lower end thereof;
   a second inner tube disposed substantially coaxially within the second outer tube and defining an outlet opening at an upper end thereof, an inlet opening at a lower end thereof, and an inflow path through the second inner tube's inlet opening via which water from the external system flows upwardly into the container;
   a first diffuser coaxially mounted on the upper ends of the second inner and outer tubes; and
   a second diffuser coaxially mounted on the lower end of the second outer tube and having an inner wall that is mounted around the periphery of the second inner tube,
   wherein the inside surface of the first outer tube and the outside periphery of the first inner tube define a first annular flow path therebetween through which water flows upwardly and towards the skimmer, and wherein the inside surface of the second outer tube and the outside periphery of the second inner tube define a second annular flow path therebetween through which water flows downwardly from the first diffuser and towards the second diffuser.

Figure 2:
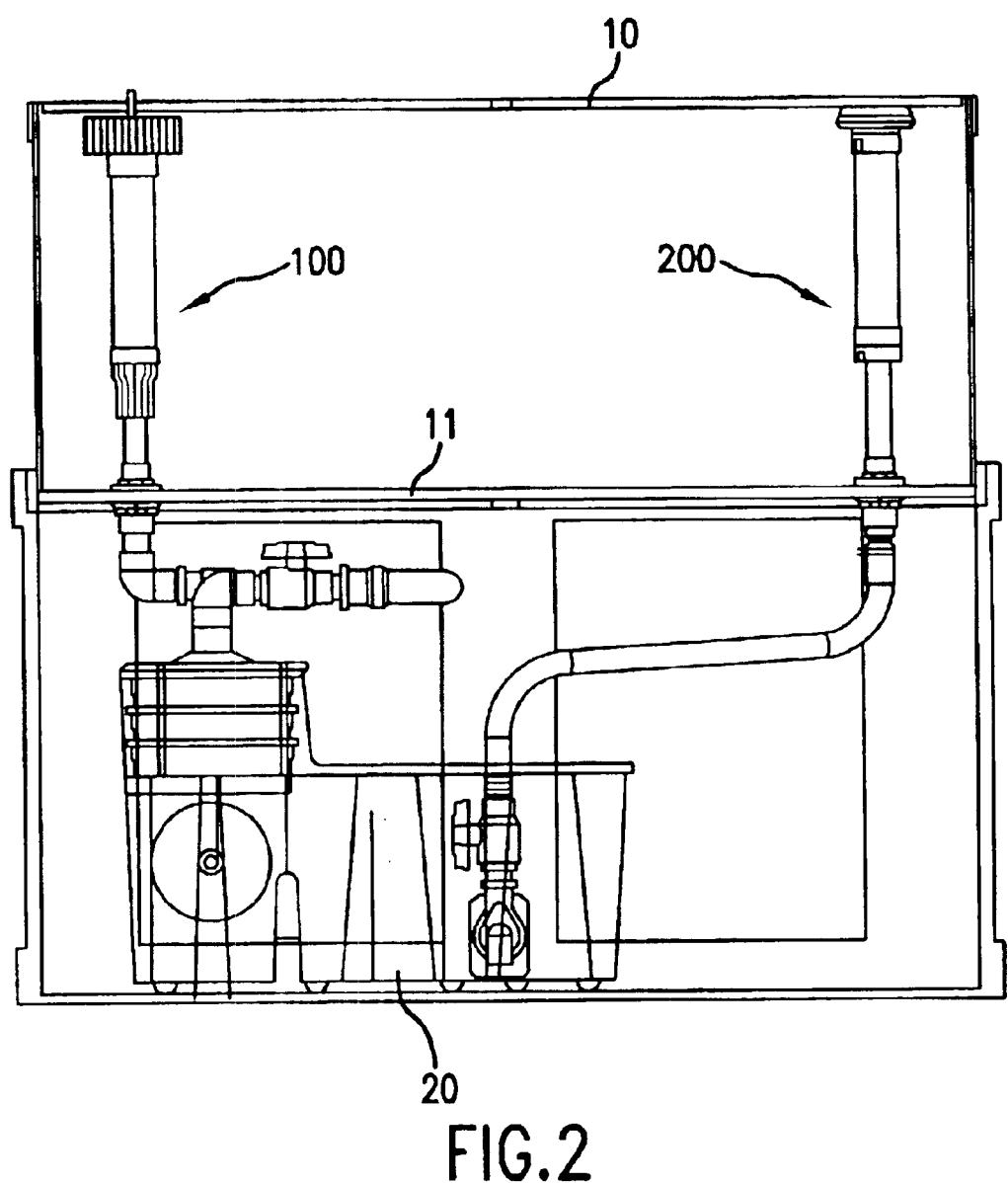
FIG. 2 shows the overflow and return assemblies of FIG. 1 in combination with an external water system.

FIG. 1 shows an overflow assembly 100 and a return assembly 200 inside a container 10, e.g., an aquarium. As shown in FIG. 2, the overflow assembly 100 and the return assembly 200 are connected with tubes, elbows, etc. to an external system 20, such as, for example, a filter assembly. As will be described in more detail below, in operation, the overflow assembly 100 directs water out of the container 10 (in the direction of Arrow A) and to the external system 20. The latter, in turn, directs water back into the container 10 by pumping, or otherwise urging, water through the return assembly 200 in the direction of Arrow B. The water level 18 in the container 10 is thus determined by the rate of water removal and return between the container 10 and the external system 20.

As shown in FIGS. 3–6, overflow assembly 100 comprises an outer tube 110 and an inner tube 120. Outer tube 110 has an inlet opening 115 at its lower end 116, as well as an outlet opening 114 at its upper end 112. Inner tube 120 is located axially within outer tube 110 and has an inlet opening 128 at its upper end 126, as well as an outlet opening 124 at its lower end 122. Thus, an annular path is defined between the inside surface of the outer tube 110 and the outside surface, or periphery, of the inner tube 120 through which water flows upwardly towards the upper ends 112,126 of the outer tube 110 and inner tube 120, respectively. As shown generally in FIG. 3, the inner tube 120 is longer than the outer tube 110 and has a lower portion 127 which extends beyond the lower end 116 of the outer tube 110.

Figure 6:
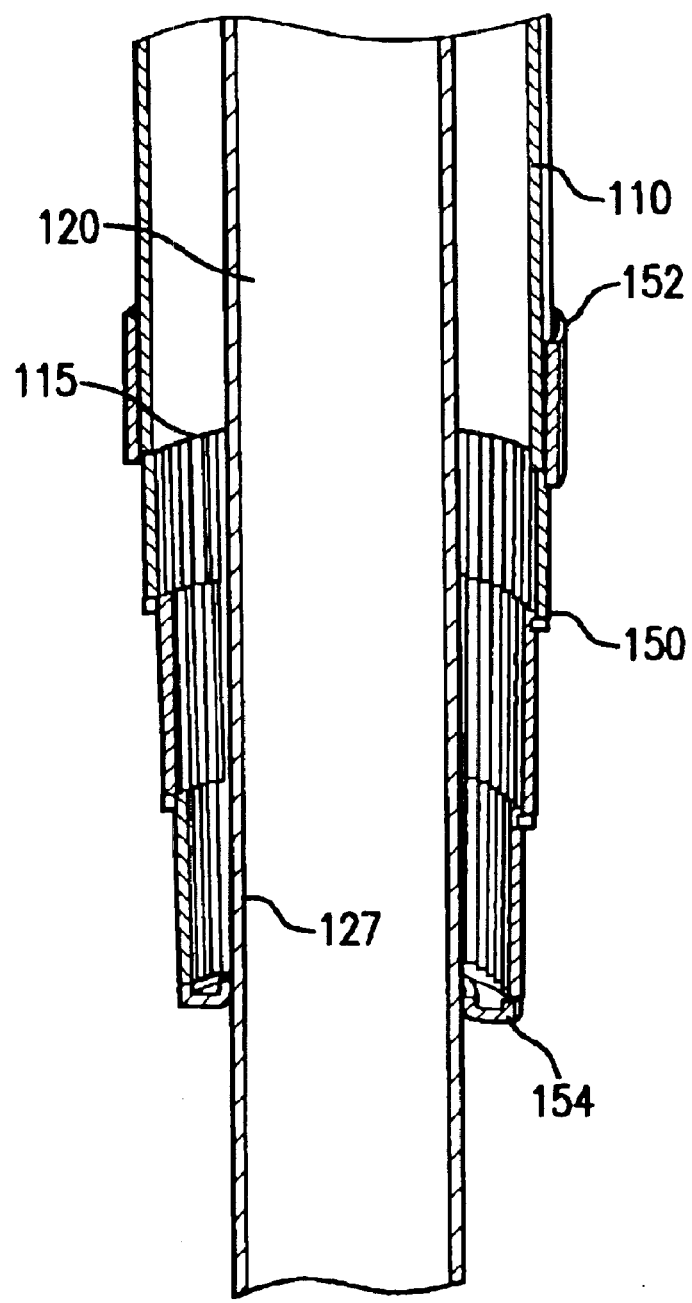
FIG. 6 is an enlarged view of lower and middle sections of the embodiment shown in FIG. 3.
Figure 7:
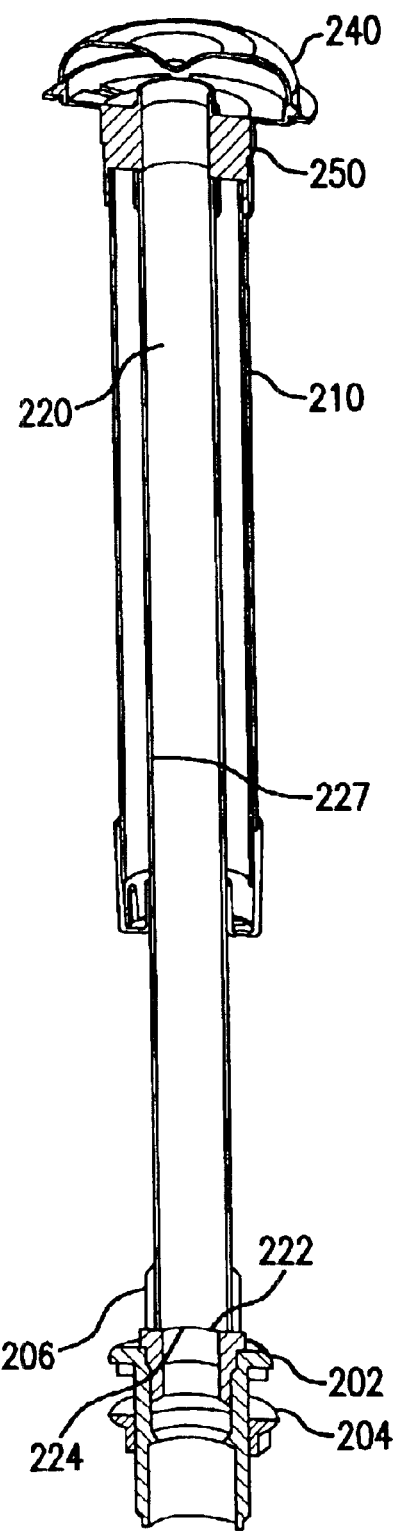
FIG. 7 is an enlarged view of the return assembly of FIG. 1.

The outer tube 110 and inner tube 120 are held together via an overflow skimmer 130 and a strainer 150. As shown in FIG. 6, in a preferred embodiment, the strainer 150 has a tapered configuration such that its diameter decreases gradually between the skimmer's upper end 152 and its lower end 154. Thus, when assembled, one end of the strainer 150 is coupled to, and in fluid communication with, the inlet opening 115 of the outer tube 110. At its lower end 154, the strainer 150 is mounted around (the periphery of) a lower portion 127 of the inner tube 120.

Figure 5:
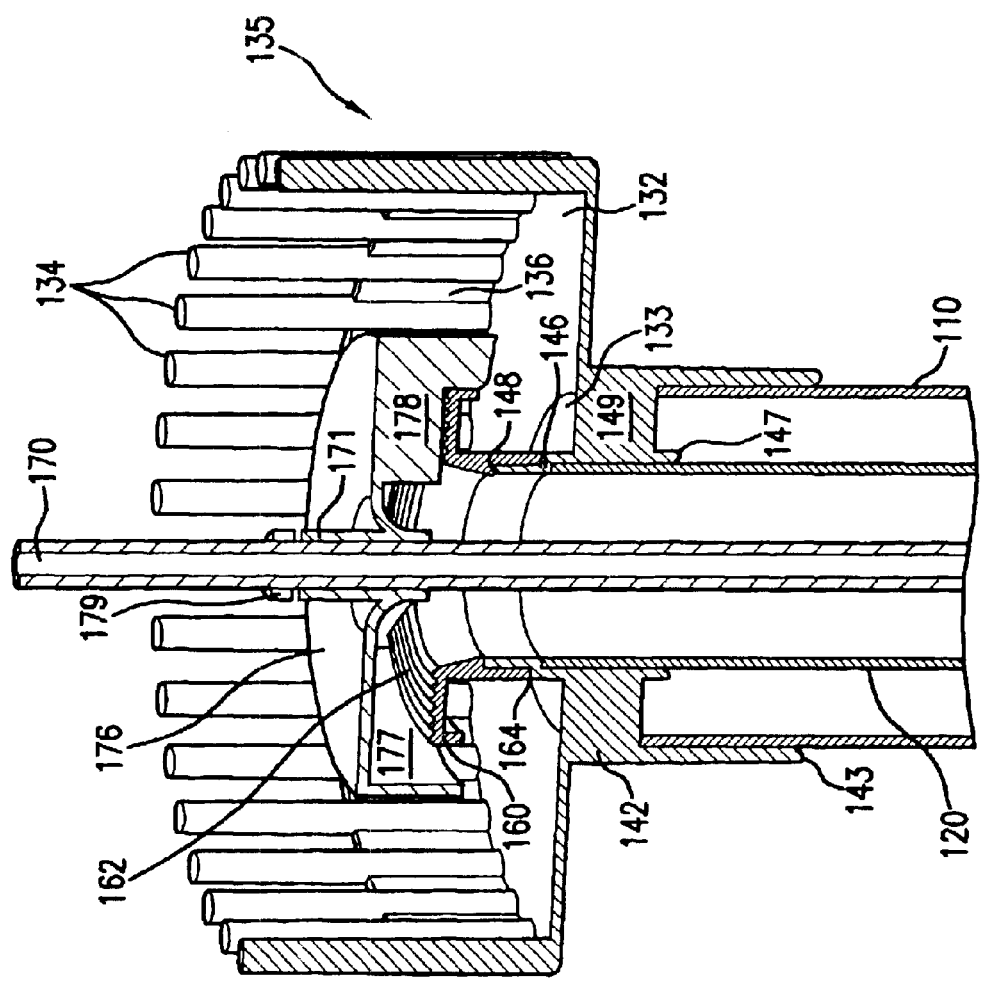
FIG. 5 is an enlarged view of an upper section of the embodiment shown in FIG. 3.

FIG. 5 shows an enlarged view of an upper section of the overflow assembly 100. The overflow skimmer 130 has a horizontal plate 132 with a vertical, ribbed wall 135 disposed along the periphery of the plate 132. The ribbed wall 135 is made of alternating vertical protrusions 134 and ribs 136 where, in a preferred embodiment, the ribs 136 are generally flat (i.e., have a generally rectangular cross section), and the vertical protrusions 134 have a generally cylindrical cross-section and extend beyond the height of the ribs 136. In one embodiment, the vertical protrusions 134 are 2–2½ times as high as the ribs 136.

The plate 132 has transverse, radial openings 133 which provide fluid communication between the upper surface of the plate 132 and the annular path between the inner tube 120 and the outer tube 110. More specifically, overflow skimmer 130 includes a first hollow coaxial extension 142 which leads vertically downwards from radial openings 133 in the plate 132. The coaxial extension 142 receives, through its lower end 143, the upper end 112 of the outer tube 110.

The skimmer 130 also includes a second hollow coaxial extension 146 which is disposed centrally within the first coaxial extension 142. The second extension 146 has an upper end 148 and receives, through its lower end 147, the upper end 126 of the inner tube 120. The second coaxial extension 146 is connected to the inner surface of the first coaxial extension 142 via a plurality of transverse, radially-extending ribs 149. Thus, each of the radial openings 133 in the plate 132 is defined by the space between two successive ribs 149. In a preferred embodiment, there are four such ribs 149, and four such radial openings 133.

Figure 3:
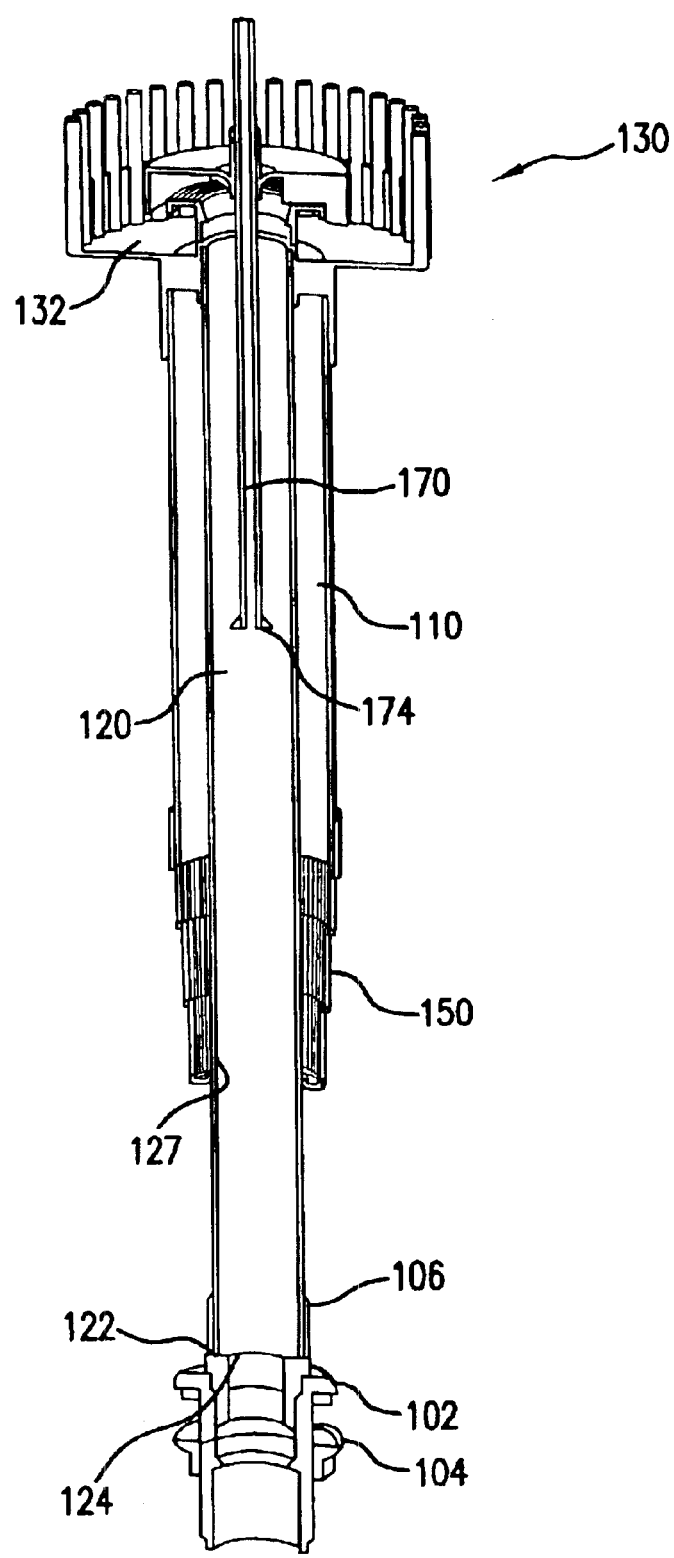
FIG. 3 is an enlarged view of the overflow assembly of FIG. 1.
Figure 4:
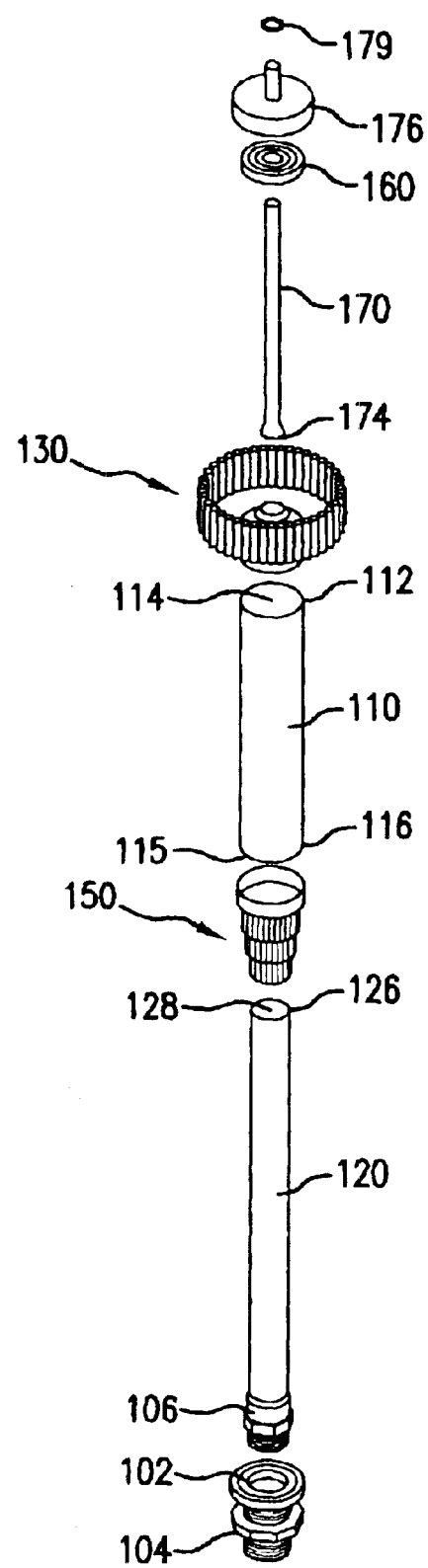
FIG. 4 is an exploded view of the embodiment shown in FIG. 3.

As shown in FIGS. 3–5, the overflow assembly 100 also includes a silent overflow device which is described in commonly-owned U.S. Pat. No. 6,056,886, the entire contents of which are incorporated herein by reference. The silent overflow device includes a vent tube 170, vent tube flare 174, tension ring 179, transverse flange 160, and cap 176.

The transverse flange 160 is disposed coaxially within the skimmers 130 and is press fit (or otherwise coupled), through its lower end 164, to the upper end 148 of the second coaxial extension 146. The flange 160 extends radially outwardly from the upper end of the second coaxial extension 146 and has an upper horizontal surface 162 which serves as the bottom surface of an annular, radial water flow path leading into inner tube 120. The upper horizontal surface 162 of flange 160 over which the water flows has a serrated, or corrugated, form. The resulting cyclic surface height variations cause drag and eddy currents and generally create turbulent flow above the flange 160. As a result, the flow resistance of the annular flow path is increased compared to a flow path bounded by a smooth lower surface. The serrated form of the upper surface of flange 160 is created by forming a series of annular grooves in that surface, which grooves are preferably circular and concentric with the longitudinal axis of inner tube 120.

Flange 160 supports a cap 176 which overlies flange 160 and the upper end 126 of inner tube 120. Cap 176 fits loosely on top of the flange 160 and has, at its periphery, a vertical, downwardly extending skirt 177. Cap 176 is positioned on flange 160 by a plurality of ribs 178 preferably forming an integral part of cap 176. The downwardly facing horizontal face of cap 176 and the upwardly facing horizontal face of flange 160 delimit a horizontal, annular water flow path ahead of the inlet opening 128 of inner tube 120. As such, the vertical dimension of the space between the surfaces of flange 160 and cap 176 is determined by the height of ribs 178.

The magnitude of the above-mentioned vertical dimension is selected as a function of the diameter of the flow path through inner tube 120. Empirical data indicates that good flow control can be achieved if this vertical dimension is at least approximately equal to one-fourth of the internal diameter of inner tube 120. This dimension will make the area of the annular flow path just ahead of the inlet opening 128 of inner tube 120 substantially equal to the cross-sectional area of the flow path through inner tube 120. For this relationship, the cross-sectional area of vent tube 170 can be ignored because it is substantially smaller than the cross-sectional area of the flow path through inner tube 120.

At the periphery of cap 176, ribs 178 project downwardly to contact a vertical, downwardly extending skirt at the periphery of flange 160. Thus, ribs 178 act to center cap 176 relative to the longitudinal axis of inner tube 120. In a preferred embodiment, there are three such ribs 178. Additionally, in preferred embodiments of the invention, cap 176 is dimensioned such that, when cap 176 is assembled to flange 160, the lower edge of the skirt 177 at the periphery of cap 176 is at the same level as, or slightly lower than, the lower edge of the skirt at the periphery of flange 160. This creates a short, annular upward flow path ahead of the above-mentioned horizontal, annular water flow path, the upward flow path being an entrance flow path to the horizontal, annular water flow path.

Cap 176 has at its center a tubular member 171 which provides an open, vertically extending passage of circular cross section and receives vent tube 170. The passage is dimensioned to allow vent tube 170 to slide easily therein in the vertical direction while maintaining at least an approximately coaxial arrangement between the longitudinal axes of tubes 170 and 120. Vent tube 170 is held in a selected vertical position relative to cap 176 by a tension ring 179. Tension ring 179 may be an elastomeric element which is dimensioned to allow a user to slide ring 179 along the length of vent tube 170, but which remains in a fixed position on vent tube 170 when not subject to an external displacement force. Thus, ring 179 acts to maintain tube 170 in a selected vertical position relative to cap 176, and inner tube 120, when the water overflow assembly is in operation. As a result, the lower end of vent tube 170 is held at a desired vertical distance from the upper end 126 of inner tube 120.

Vent tube 170 is open at both ends to provide an air flow path. The lower end of vent tube 170 is located within, and below the upper end of, inner tube 120. The length of vent tube 170 is selected so that when the lower end of vent tube 170 is at the greatest desired distance below the upper end 126 of inner tube 120, the upper end of vent tube 170 will be above the highest desired water level in container 10.

The lower end of vent tube 170 carries, on its outer peripheral surface, a vent tube flare 174 that protrudes radially outwardly within inner tube 120. The vent tube flare 174 is axially symmetrical throughout its length, i.e., flare 174 has a circular outline in every plane perpendicular to its longitudinal axis. In the region below the lower end of vent tube 170, vent tube flare 174 separates the water flowing through inner tube 120 into a mixed phase composed primarily of water in the outer portion of the flow path, i.e., adjacent the inner surface of inner tube 120, and air in the center portion of the flow path. Vent tube flare 174 provides resistance to water flow through inner tube 120 and thus, provides a means of controlling water level in the container 10.

More specifically, the components 170, 120, 160, and 176 control the flow of water out of the container 10 in a manner which eliminates virtually all noise caused by water exiting the container 10. Noise prevention is accomplished by preventing a vortex from occurring in the water entering inner tube 120 and yet providing an open air passage, through vent tube 170, to the water stream in inner tube 120 at all times. The combination of flange 160, cap 176, and vent tube 170 produces this result in the following manner.

When cap 176 is assembled to flange 160, the lower edge of the skirt 177 at the periphery of cap 176 is at the same level as, or slightly lower than, the lower edge of the skirt at the periphery of flange 160. This creates a water flow path that contributes significantly to the prevention of vortices at relatively high flow rates (e.g. 500 gph and higher). In addition, the vertical, annular cross-sectional area of the horizontal flow path formed between the horizontal surfaces of flange 160 and cap 176 at a point just before the water turns into the inlet opening 128 of inner tube 120 is preferably approximately equal to the cross-sectional area enclosed by the inside diameter of inner tube 120.

Moreover, the serrations on the surface 162 of flange 160 create resistance and turbulence at this surface. This resistance, especially at low flow rates, requires a higher water level in the container 10 to produce a certain water flow rate through the horizontal flow path, thus assuring that water level 18 will remain above the top surface of cap 176. As a result, vortexing and, therefore, noise are prevented over a wide range of flow rates and even at relatively low flow rates as low as 300 gph. In addition, the vent tube sub-assembly is configured such that the vent tube flare 174 creates resistance to water flow and diverts flowing water away from the end of vent tube 170 to create an air path into the water stream. Since this air path will be continuously open during normal operation, there is no surging, gurgling, or hissing of water in inner tube 120.

Water level 18 in the container 10 can be adjusted to a desired height for any existing flow rate by suitably positioning the lower end of vent tube 170 relative to the top of cap 176, water level 18 in container 10, or other fixed reference point in container 10, to achieve a particular value for the vertical distance between the lower end of vent tube flare 174 and the fixed reference point in the container 10. Specifically, the amount of (vertical) distance that is needed to maintain a given water level in container 10 varies directly with the flow rate. That is, the distance will be smaller for a low flow rate than for a high flow rate.

Thus, the present invention allows for variations in this vertical distance versus flow rate in order to maintain a desired height for water level 18 in the container 10. As mentioned before, the structure of the silent overflow device permits the vertical position of vent tube 170 to be adjusted relative to inner tube 120. The fit of vent tube 170 in cap 176 is loose, allowing vent tube 170 to slide up and down. On the other hand, tension ring 179 fits somewhat tightly onto the outside surface of vent tube 170. However, tension ring 179, because it is a spring-like structure, can be easily slipped up and down along vent tube 170 to set the distance of the lower end of vent tube 170 relative to the upper end 126 of inner tube 120. Rather than allowing water level 18 in the container 10 to rise in order to create a needed higher pressure, the vertical distance between the lower end of vent tube 170 and the upper end 126 of inner tube 120, or cap 176, is increased. The overall effect is the same relative to the end of the vent tube 170, but water level 18 in container 10 will be maintained at a desired height.

FIGS. 7–10 show the return assembly 200 having an outer tube 210 and an inner tube 220. Outer tube 210 has an inlet opening 214 at its upper end 212, as well as an outlet opening 215 at its lower end 216. Inner tube 220 is located axially within outer tube 210 and has an inlet opening 224 at its lower end 222, as well as an outlet opening 228 at its upper end 226. Thus, an annular path is defined between the inside surface of the outer tube 210 and the outside surface, or periphery, of the inner tube 220 through which water flows downwardly towards the lower end 216 of the outer tube 210. As shown generally in FIG. 7, the inner tube 220 is longer than the outer tube 210 and has a lower portion 227 which extends beyond the lower end 216 of the outer tube 210.

Figure 10:
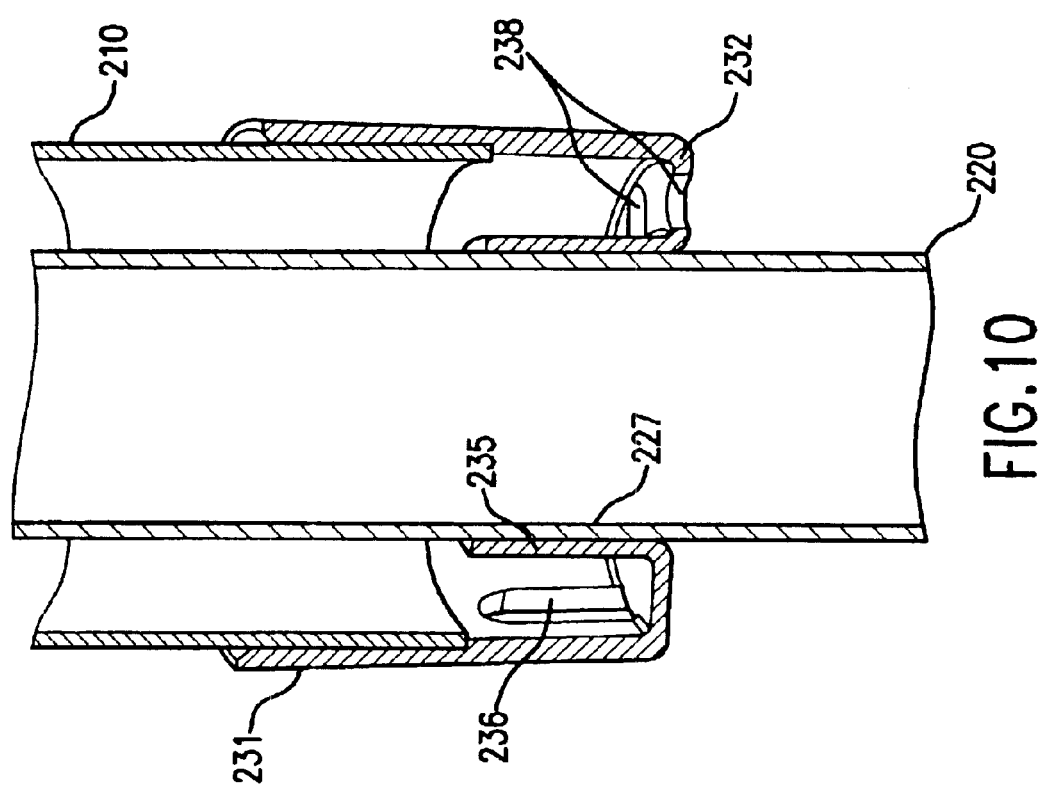
FIG. 10 is an enlarged view of lower and middle sections of the embodiment shown in FIG. 7.

The outer tube 210 and inner tube 220 are held together via a first diffuser 250 and a second diffuser 230. As shown in FIG. 10, in a preferred embodiment, the second diffuser 230 has a tubular configuration having base 232 that connects an outer wall 231 to an inner wall 235. Outer wall 231, in turn, contains side openings 236 that allow water to flow horizontally into a middle and/or lower portion of the container 10. Similarly, the base 232 contains bottom openings 238 which direct water, in a substantially vertical direction, into a middle and/or lower portion of the container 10. When assembled, one end of the second diffuser 230 is coupled to, and in fluid communication with, the outlet opening 215 of the outer tube 210 such that the outer wall 231 is disposed around the lower end 216 of the outer tube 210. At the same time, the inner wall 235 is mounted around (the periphery of) a lower portion 227 of the inner tube 220.

In a preferred embodiment, the second diffuser 230 may contain three side openings 236 and two bottom openings 238. In addition, where the diffuser 230 has a circular cross-section, the side openings 236 may be arranged along the outer wall 231 along an approximately 60° arc. Moreover, the bottom openings 238 and the side openings 236 may be disposed on diametrically opposite sides of the diffuser 230. Thus, rotation of the diffuser 230 around the inner tube 220 provides for a degree of control over the placement of the "horizontal" and "vertical" flows within the container 10.

Figure 9:
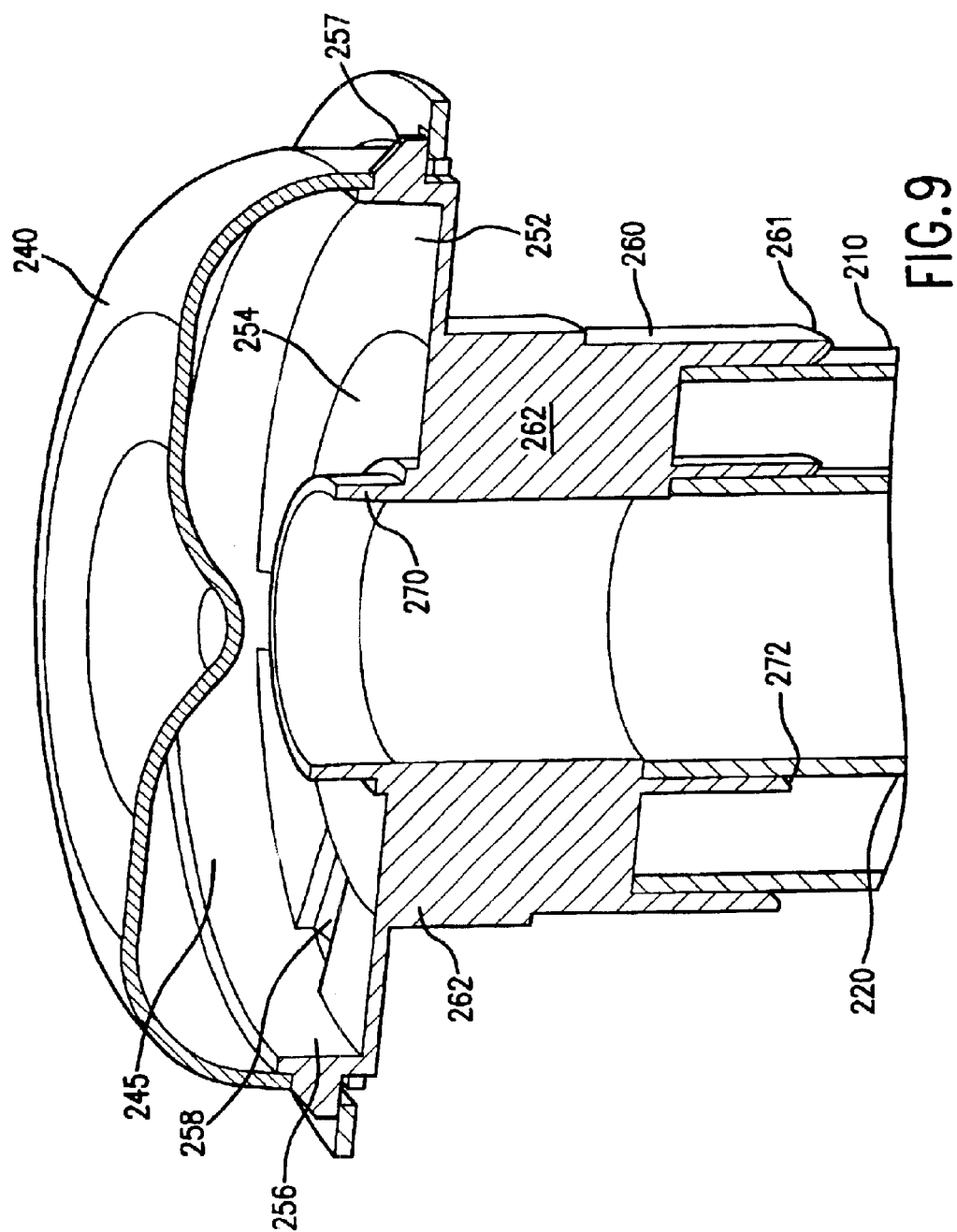
FIG. 9 is an enlarged view of an upper section of the embodiment shown in FIG. 7.

FIG. 9 shows an enlarged view of an upper section of the return assembly 200. The first diffuser 250 includes a rimmed base 252 having a rim 256, as well as first and second hollow coaxial members 260, 270, respectively. The base 252 has one or more passageways 254 which provide fluid communication between the upper surface of the base 252 and the annular path between the inner tube 220 and the outer tube 210. More specifically, the first coaxial member 260 extends vertically downwards from the passageway(s) 254 in the base 252 and receives, through its lower end 261, the upper end 212 of the outer tube 210.

The first diffuser 250 also includes a second hollow coaxial member 270 which is disposed centrally within the first coaxial member 260 and receives, through its lower end 272, the upper end 226 of the inner tube 220. The second coaxial member 270 is connected to the inner surface of the first coaxial member 260 via a plurality of transverse, radially-extending ribs 262. Thus, each passageway 254 in the base 252 is defined by the space between two successive ribs 262. In a preferred embodiment, the return assembly 200 includes two passageways 254 spanning approximately a combined 210° arc.

The first diffuser 250 includes a cap 240 that is removably coupled to the base 252 via, e.g., a twist-lock mechanism 257. The space enclosed between the rimmed base 252 and the diffuser cap 240 defines a compartment 245 which serves as a temporary receptacle for water that flows into the container via the inner tube 220. In a preferred embodiment, the diffuser cap 240 is contoured such that water entering the compartment 245 is directed towards the periphery of the compartment (FIG. 9).

As mentioned before, one or more passageways 254 provide fluid communication between the compartment 245 and the annular flow path between the inner tube 220 and the outer tube 210. Thus, a portion of the water entering the compartment 245 through the inner tube 220 is directed through the passageway(s) 254 and downwards toward the second diffuser 230 such that it exists into a middle/lower portion of the container 10.

Figure 8:
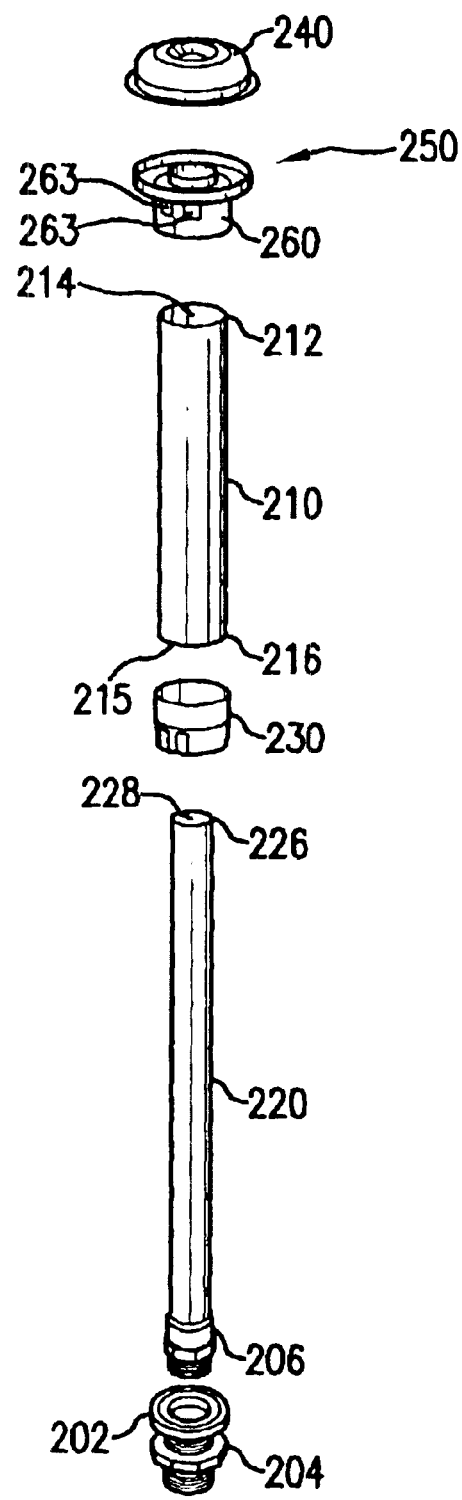
FIG. 8 is an exploded view of the embodiment shown in FIG. 7.

The first diffuser 250 includes openings for directing water into an upper portion of the container 10. More specifically, the base 252 includes upper radial openings 258, and the first hollow coaxial member 260 includes lower radial openings 263 (FIG. 8). In a preferred embodiment, each upper radial opening 258 is a concave channel that extends radially outwards in the base 252 (i.e., each channel forms a portion of the undersurface of the base 252). As such, each of The channels directs water from inside the compartment 245 to the container 10 through an underside of the base 252.

Where the first diffuser 250 has a circular cross section, the base 252 includes four such concave channels that are arranged along an approximately 150° arc (e.g., from the centerline of the first channel to the centerline of the fourth channel) so that the water flow is biased in the direction of the openings. The 150° arc is generally non-overlapping with the approximately 210° arc along which the passageway(s) 254 are disposed. That is, the openings 258 and the passageway(s) 254 are situated "opposite" each other on arcs that, together, complete the circular cross section of the base 252. Thus, rotation of the diffuser. 250 around the outer tube 210 provides for a degree of control over the placement of the outflow from the openings 258 into the container 10.

The lower radial openings 263 are typically apertures that are defined in the wall of the first hollow coaxial member 260. In a preferred embodiment, the apertures 263 are disposed vertically below, and horizontally (i.e., radially) centered, with respect to the concave channels that form the openings 258. In such an embodiment, water flows from the compartment 245 into an area that is enclosed by the walls of the first and second coaxial members 260, 270, a pair of transverse ribs 262, and a bottom wall (i.e., a wall lying in a plane that is perpendicular to the longitudinal axis of the inner tube 220), and then out of the side apertures 263. As before, rotation of the diffuser 250 around the outer tube 210 provides for a degree of control over the placement of the outflow from apertures 263 into the container 10.

In practice, the bottom wall 11 of the container 10 is drilled to create two holes for placement, respectively, of each of the inner tubes 120, 220 therethrough. FIGS. 1–4 and 7–8 show conventional means for attaching each of the inner tubes 120, 220 to the bottom wall 11 of the container 10. Bulkhead adapter fittings 102, 202 are installed into each of the drilled holes. The bottom of each bulkhead adapter is connected to the external system, e.g., filtration device, using a series of pipe fitting adapters, elbows, flexible tube, and ball valve. The ball valve is used to shut off the flow of water to the filtration device when servicing the overflow and/or the return assemblies.

The lower end 122 of the inner tube 120 is fitted with a male adapter fitting 106, and the lower end 222 of the inner tube 220 is fitted with a male adapter fitting 206. Each male adapter fitting has a pipe thread on one end and a tapered bore at the other end. Thus, the inner tubes 120,220 are attached (e.g., glued) into the tapered bore end of the male adapter fittings 106,206, respectively, and the threaded ends of the male adapter fittings 106,206 are installed into the bulkhead adapter fittings 102,202, respectively, and tightened. A bulkhead nut. 104,204 is threaded to each of the bulkhead fittings 102,202 on an outer surface of the container's bottom wall 11. This results in a standpipe arrangement, with the top of each of the inner tubes 120,220 determining the vertical location of the upper portion of the overflow and return assemblies.

The upper portion of the overflow assembly, including the outer tube 110, the skimmer 130, and the silent overflow device (including vent tube 170, vent tube flare 174, tension ring 179, transverse flange 160, and cap 176) slide over the inner tube 120 that is fixed into the bulkhead adapter in the container 10. When the upper end 126 of the inner tube 120 slides into and stops within the overflow skimmer 130, the overflow assembly is complete. The only further adjustment that is required is that of the vent tube 170 for noise, flow control, and/or water level. In a preferred embodiment, all components may be press fit together so that the parts can easily be disassembled for service and cleaning.

In a similar manner, the upper portion of the return assembly, including the outer tube 210, the first diffuser and cap 250,240, and the second diffuser 230, are assembled and slid onto the inner tube 220 that is fixed into the bulkhead adapter in the container 10. When the upper end 226 of the inner tube 220 slides into and stops within the first diffuser 250, the return assembly is complete. As before, in a preferred embodiment, all components may be press fit or twist-locked together so that the parts can easily be disassembled for service and cleaning.

In an example where the container 10 is an aquarium and the external system 20 is a filtration device, the overflow assembly 100 removes water from the aquarium and directs it to the filtration device, which rnay be located in an aquarium stand below the aquarium. The return assembly 200, in turn, returns water to the aquarium from the filtration device.

In operation, water is returned to the aquarium from the filtration device via a pumping means and a series of fittings, flexible tubing, etc. As the water is returned to the aquarium, the water level in the aquarium rises and begins to flow into the overflow skimmer between the vertical cylindrical protrusions 134. The vertical cylindrical protrusions, in combination with the ribs 136, form "comb" members in the vertical ribbed wall 135, wherein a strainer effect is produced in order to prevent large objects such as leaves, fish, and other floating objects from flowing into the inner portion of the overflow skimmer.

The water level 18 in the aquarium reaches a point of equilibrium when the height of the water above the top of the transverse flange 160 creates a rate of flow through the overflow assembly equal to the flow of water returning to the aquarium by the pumping means. The silent overflow device is then adjusted to maintain the water level in the aquarium in the middle of the vertical cylindrical protrusions 134. This permits flow variations that will neither overflow the top of the skimmer nor cause the objectionable "gurgling" noise common to some existing devices.

In addition to skimming water off the surface through the overflow skimmer, water also flows into the overflow assembly through the strainer 150, thereby drawing water from the middle-to-bottom of the aquarium into the overflow assembly. This occurs due to the difference in height between the top of the transverse flange and the top of the ribs 136 in the vertical ribbed wall 135. To illustrate, if water flow into the aquarium were just sufficient to cause the water surface to align with the top of the ribs 136, then all water flow through the overflow assembly would come from the strainer 150. The pressure differential due to the difference in water height between the top of the transverse flange 160 and the top of the ribs 136 causes water to flow through the strainer, into and through the annular path between the inner tube and outer tube, through openings 133 in the bottom of the skimmer plate 132, through the space between the cap 176 and transverse flange 160, and into the inner tube 120.

In returning to the aquarium, water is urged, via a pumping means and a series of fittings, flexible tubing, etc., from the filtration device and enters the inner tube 220 of the return assembly. The water flows through the inner tube and strikes the inside surface of the diffuser cap 240. As described previously, the inside surface of the diffuser cap is contoured such that the water flow is directed along the inside surface of the diffuser cap to the outer ring of the rimmed base 252. Water then flows out of concave-channel openings 258 which direct flow of filtered water onto the surface of the aquarium. Water also flows out of apertures 263 which are centered below the openings 258 and direct filtered water to just below the water surface. The flow of filtered water through the combination of these outlets in the first diffuser 250 causes gentle agitation of the surface of the aquarium water, thereby oxygenating the aquarium water and reducing surface scum (e.g., oils, fish food, dust, etc.).

In addition to returning filtered water to the aquarium surface through the first diffuser 250, the present invention also provides means for allowing water to flow down through the outer tube 210 to the second diffuser 230, thereby directing filtered water into the middle-to-bottom of the aquarium. To this end, passageways 254 through the rimmed base direct filtered water into the annular flow path between the inner and outer tubes 220, 210; the water then flows out of side openings 236 and bottom openings 238 in the second diffuser 230. As discussed above, the side openings 236 are designed to cause water to exit the second diff user in a somewhat horizontal flow, and the bottom openings 238 are designed to cause filtered water to exit in a generally vertical, downward direction. The downward-directed flow aids the circulation within the aquarium and reduces the possibility of a "dead" zone in the lower comer of the aquarium near the return assembly.

The overflow and return assemblies of the present invention thus provide numerous advantages over existing systems. For example, the overflow and return assemblies can easily accommodate containers of different height simply by increasing or decreasing the length of the inner and outer tubes. In addition, the inner and outer tubes can be shortened so that partially-filled aquariums can be filtered in the same manner as a completely-filled aquarium. This is important because turtles, frogs, and other amphibians are usually kept in partially-filled aquariums, often with large rocks for the animals to rest on out of the water. Filtration for this type of aquarium is easily accomplished by simply shortening the inner tube for both the overflow and return assemblies to set the water height, and then shortening the outer tube for each assembly as desired.

Moreover, the vertical location of the strainer can be optimized by changing the length of the outer tube independently of the inner-tube length, as long as the strainer is positioned, e.g., above the gravel in an aquarium. This allows the user to maximize the circulation efficacy within the aquarium. Similarly, the vertical location of the bottom diffuser can be optimized by changing the length of the outer tube independently of the inner-tube length, thus, again, maximizing the circulation efficacy within the aquarium.

The present invention also provides means for drawing water from both the surface and middle-to-bottom of the container and for returning water at the surface, just below the surface, and into the middle-to-bottom of the container. Drawing water at, and just below, the surface contributes to the oxygenation of the aquarium water by gently agitating the water at these locations. In addition, the silent overflow device can be adjusted to provide control over the flow and/or water level, while the upper (first) and lower (second) diffusers can be independently directionally adjusted to maximize the circulation efficacy within the aquarium.

Because the overflow assembly and the return assembly can be placed at any drilled hole location within the aquarium, the present invention offers an added degree of versatility in that aquariums can be custom-made so as to place the overflow and/or return assemblies anywhere within the aquarium, as desired by the user. In addition, multiple overflow and return assemblies can be installed in (larger) aquariums in order to maximize filtration and tank circulation.

From a practical standpoint, the overflow and return assemblies are very compact and non-obtrusive, and obscure very little within the aquarium. In addition, the upper portions of the overflow and return assemblies can be easily removed from the aquarium and disassembled for maintenance and cleaning. Finally, each assembly installs into a drilled hole on the bottom of the aquarium such that there are no hang-on devices that are objectionable in appearance, difficult to service, or that prevent installation of the aquarium close to walls.

While the description above refers to particular embodiments of the present invention, it will be understood that many modifications may be made without departing from the spirit thereof. For example, while the preferred embodiment of the invention may utilize tubes, etc. that have cylindrical cross-sections, the invented system may also be constructed from components having other cross-sectional geometries, such as, e.g., square, rectangular, triangular, oval, etc. As such, the accompanying claims are intended to cover such modifications as would fall within the true scope and spirit of the present invention.

The presently disclosed embodiments are, therefore, to be considered in all respects as illustrative and not restrictive, the scope of the invention being indicated by the appended claims rather than the foregoing description. All changes that come within the meaning, and range of equivalency, of the claims are intended to be embraced therein.

What is claimed is:

1. A device for removing water from a container, said device comprising:
    a first tube located within the container and defining an outlet opening at an upper end thereof and an inlet opening at a lower end thereof;
    a second tube disposed substantially coaxially within the first tube and defining an inlet opening at an upper end thereof, an outlet opening at a lower end thereof, and an outflow path through the second tube's outlet opening via which water flows downwardly out of the container;
    an overflow skimmer removably coupled to the upper ends of said first and second tubes;
    a transverse flange disposed coaxially within the skimmer;
    a cap overlying the flange so as to define with said flange a first annular flow path via which water flows to the inlet opening of the second tube;
    a vent tube extending vertically downwardly through said cap, transverse flange, and skimmer and into said second tube; and
    a strainer coupled to the inlet opening of the first tube and having a lower end that is disposed around the periphery of the second tube;
    wherein the inside surface of the first tube and the outside periphery of the second tube define a second annular path therebetween through which water flows upwardly and towards the first annular flow path.

2. The device of claim 1, wherein said skimmer comprises a horizontal plate and a vertical ribbed wall disposed along the periphery of said plate.

3. The device of claim 2, wherein the overflow skimmer further includes a first hollow coaxial extension leading vertically downwards from radial openings in the plate, said extension being configured to connect to the upper end of the first tube such that the second annular flow path is in fluid communication with a top surface of the skimmer plate.

4. The device of claim 3, the skimmer further including a second hollow coaxial extension disposed within said first coaxial extension, wherein said second extension has an upper end that is coupled to said transverse flange and a lower end that is coupled to the upper end of the second tube.

5. The device of claim 4, wherein said second extension is connected to the inner surface of the first extension via a plurality of transverse, radially-extending ribs, and wherein each pair of successive ribs defines therebetween one of said radial openings in the horizontal plate.

6. The device of claim 4, wherein said transverse flange extends radially outwardly from said upper end of the second extension and has an upper surface that forms a lower boundary of said first annular flow path.

7. The device of claim 6, wherein said cap has a periphery and includes a downwardly extending skirt which surrounds, and is radially spaced from, said flange to define with said flange an entrance flow path via which water flows upwardly to the first annular flow path.

8. The device of claim 6, wherein said upper surface of said flange has surface irregularities which impart an increased flow resistance to the first annular flow path.

9. The device of claim 8, wherein said surface irregularities comprise a series of grooves which extend transversely to the direction of flow through the first annular flow path.

10. The device of claim 2, wherein said vertical wall of the overflow skimmer comprises a plurality of alternating vertical protrusions and ribs.

11. The device of claim 10, wherein said protrusions are cylindrical and extend beyond the height of said ribs.

12. The device of claim 1, wherein said vent tube has a lower end located within said second tube and is vertically movable relative to said cap for varying the distance between the lower end of said vent tube and said upper end of said second tube.

13. The device of claim 12, further comprising diverter means mounted at said lower end of said vent tube for deflecting water which is flowing past said vent tube radially outwardly away from said vent tube.

14. The device of claim 12 further comprising a retaining element mounted on said vent tube and manually movable relative to said vent tube for holding said vent tube in a selected position relative to said cap.

15. The device of claim 1, wherein the second tube is longer than the first tube such that a lower portion of the second tube extends beyond the lower end of the first tube, and said strainer is tapered such that its lower end is slidably mounted on said lower portion of the second tube.

16. The device of claim 1, wherein said container has a bottom wall and said lower end of said second tube is fitted with means for connecting said second tube through said bottom wall.

17. The device of claim 16, wherein said means for connecting includes a male adapter fitting coupled to said lower end of said second tube, a bulkhead fitting coupled to said adapter fitting on an inside surface of said bottom wall, and a bulkhead nut threaded to the bulkhead fitting on an outer surface of said bottom wall.

18. A device for transferring water to a container from an external system, said device comprising:
   a first tube located within the container and defining an inlet opening at an upper end thereof and an outlet opening at a lower end thereof;
   a second tube disposed substantially coaxially within the first tube and defining an outlet opening at an upper end thereof, an inlet opening at a lower end thereof, and an inflow path through said second tube's inlet opening via which water flows upwardly into the container;
   a first diffuser coaxially mounted on the upper end of said first tube and including upper and lower radial openings for directing water into an upper portion of the container;
   a second diffuser coupled to said lower end of the first tube and including side and bottom openings for directing water into a middle or lower portion of the container; and
   a diffuser cap releasably coupled to the first diffuser so as to define with the first diffuser a compartment from which water is distributed into the container via said first and second diffusers,
   wherein the inside surface of the first tube and the outside periphery of the second tube define an annular flow path therebetween through which water flows downwardly from said compartment and towards the second diffuser.

19. The device of claim 18, wherein the first diffuser includes a rimmed base and a first hollow coaxial member extending vertically downwards from said base, said coaxial member being configured to connect to the upper end of the first tube such that the annular flow path is in fluid communication with said compartment through a passageway in said base.

20. The device of claim 19, the first diffuser further including a second hollow coaxial member disposed within said first coaxial member, wherein said second member has a lower end that is coupled to the upper end of the second tube.

21. The device of claim 20, wherein said second coaxial member is connected to the inner surface of the first coaxial member via a plurality of transverse, radially-extending ribs, and wherein a pair of successive ribs defines therebetween said passageway leading from said compartment to said annular flow path.

22. The device of claim 19, wherein each said upper radial opening is a concave channel in said base extending radially outwards so as to direct water from inside the compartment to the container through an underside of the base.

23. The device of claim 22, wherein each said lower radial opening is an aperture in the wall of the first hollow coaxial member.

24. The device of claim 23, wherein said concave channels are arranged on said base along an approximately 150° arc and said apertures are disposed vertically below, and horizontally centered, with respect to said concave channels.

25. The device of claim 19, wherein each said lower radial opening is an aperture in the wall of the first hollow coaxial member.

26. The device of claim 18, wherein said first diffuser is rotatably mounted on said upper end of said first tube.

27. The device of claim 18, wherein the second tube is longer than the first tube such that a lower portion of the second tube extends beyond the lower end of the first tube, and said second diffuser has an inner wall that is rotatably mounted on said lower portion of the second tube.

28. The device of claim 18, wherein said second diffuser has a base, an inner wall, and an outer wall, and said side openings are arranged along said outer wall of the second diffuser along an approximately 60° arc.

29. The device of claim 28, wherein said bottom openings are defined through said base of the second diffuser.

30. The device of claim 29, wherein the bottom openings and the side openings are disposed on diametrically opposite sides of the second diffuser.

31. The device of claim 18, wherein said diffuser cap is coupled to the first diffuser with a twist-lock mechanism.

32. The device of claim 18, wherein the diffuser cap is contoured so as to direct water entering the compartment towards the periphery of said compartment.

33. The device of claim 18, wherein said container has a bottom wall and said lower end of said second tube is fitted with means for connecting said second tube through said bottom wall.

34. The device of claim 33, wherein said means for connecting includes a male adapter fitting coupled to said lower end of said second tube, a bulkhead fitting coupled to said adapter fitting on an inside surface of said bottom wall, and a bulkhead nut threaded to the bulkhead fitting on an outer surface of said bottom wall.

35. The device of claim 18, wherein said container is an aquarium.

36. The device of claim 35, wherein said external system is a filtration device.

37. A device for circulating water between a container and an external system so as to maintain a desired water level in the container, said device comprising:
   (a) an overflow assembly comprising:
      a first outer tube located within the container and defining an outlet opening at an upper end thereof and an inlet opening at a lower end thereof;
      a first inner tube disposed substantially coaxially within the first outer tube and defining an inlet opening at an upper end thereof, an outlet opening at a lower end thereof, and an outflow path through the first inner tube's outlet opening via which water flows downwardly out of the container and to the external system;

an overflow skimmer removably coupled to the upper ends of said first inner and outer tubes;

a vent tube extending vertically downwardly through said skimmer and into said first inner tube; and a strainer coupled to the inlet opening of the first outer tube and having a lower end that is disposed around the periphery of the first inner tube; and (b) a return assembly comprising:

a second outer tube located within the container and defining an inlet opening at an upper end thereof and an outlet opening at a lower end thereof;

a second inner tube disposed substantially coaxially within the second outer tube and defining an outlet opening at an upper end thereof, an inlet opening at a lower end thereof, and an inflow path through the second inner tube's inlet opening via which water from the external system flows upwardly into the container;

a first diffuser coaxially mounted on the upper ends of the second inner and outer tubes; and a second diffuser coaxially mounted on the lower end of the second outer tube and having an inner wall that is mounted around the periphery of the second inner tube, wherein the inside surface of the first outer tube and the outside periphery of the first inner tube define a first annular flow path therebetween through which water flows upwardly and towards the skimmer, and wherein the inside surface of the second outer tube and the outside periphery of the second inner tube define a second annular flow path therebetween through which water flows downwardly from the first diffuser and towards the second diffuser.

38. The device of claim 37, said overflow assembly further including a transverse flange disposed coaxially within the skimmer and a cap overlying the flange so as to define with said flange a third annular flow path via which water flows to the inlet opening of the first inner tube.

39. The device of claim 38, wherein the overflow skimmer comprises:

a horizontal plate and a vertical ribbed wall disposed along the periphery of said plate;

a first hollow coaxial extension leading vertically downwards from radial openings in the plate, said extension being configured to connect to the upper end of the first outer tube such that the first annular flow path is in fluid communication with a top surface of the skimmer plate; and a second hollow coaxial extension disposed within said first coaxial extension, said second extension having an upper end that is coupled to the transverse flange and a lower end that is coupled to the upper end of the first inner tube.

40. The device of claim 39, wherein said second extension is connected to the inner surface of the first extension via a plurality of transverse, radially-extending ribs, and wherein each pair of successive ribs defines therebetween one of said radial openings in the horizontal plate.

41. The device of claim 39, wherein said transverse flange extends radially outwardly from said upper end of the second extension and has an upper surface that forms a lower boundary of said third annular flow path, and wherein said cap has a periphery and includes a downwardly extending skirt which surrounds, and is radially spaced from, said flange to define with said flange an entrance flow path via which water flows upwardly to the third annular flow path.

42. The device of claim 39, wherein said vertical wall of the overflow skimmer comprises a plurality of alternating vertical protrusions and ribs, said protrusions extending beyond the height of said ribs.

43. The device of claim 38, wherein said vent tube has a lower end located within said first inner tube and is vertically movable relative to said cap for varying the distance between the lower end of said vent tube and said upper end of said first inner tube.

44. The device of claim 43, further comprising diverter means mounted at said lower end of said vent tube for deflecting water which is flowing past said vent tube radially outwardly away from said vent tube.

45. The device of claim 37, wherein the first inner tube is longer than the first outer tube such that a lower portion of the first inner tube extends beyond the lower end of the first outer tube, and said strainer is tapered such that its lower end is slidably mounted on said lower portion of the first inner tube.

46. The device of claim 37, said return assembly further including a diffuser cap releasably coupled to the first diffuser so as to define with the first diffuser a compartment from which water is distributed into the container via said first and second diffusers.

47. The device of claim 46, wherein the first diffuser comprises:

a rimmed base;

a first hollow coaxial member extending vertically downwards from said base, said coaxial member being configured to connect to the upper end of the second outer tube such that the second annular flow path is in fluid communication with the compartment through a passageway in said base; and a second hollow coaxial member disposed within the first coaxial member, wherein the second member has a lower end that is coupled to the upper end of the second inner tube.

48. The device of claim 47, wherein the second coaxial member is connected to the inner surface of the first coaxial member via a plurality of transverse, radially-extending ribs, and wherein a pair of successive ribs defines therebetween said passageway leading from the compartment to the second annular flow path.

49. The device of claim 47, wherein the first diffuser is rotatably mounted on the upper end of the second outer tube and further includes:

a plurality of concave channels in the base, each channel extending radially outwards so as to direct water from inside the compartment to the container through an underside of the base; and a plurality of apertures in the wall of the first hollow coaxial member so as to direct water into an upper portion of the container.

50. The device of claim 46, wherein the diffuser cap is contoured so as to direct water entering the compartment towards the periphery of said compartment.

51. The device of claim 37, wherein the second inner tube is longer than the second outer tube such that a lower portion of the second inner tube extends beyond the lower end of the second outer tube, and said second diffuser has a lower end that is rotatably mounted on said lower portion of the second inner tube.

52. The device of claim 37, wherein said second diffuser has a base defining a plurality of bottom openings therethrough and an outer wall defining a plurality of side openings therethrough so as to direct water into a middle or lower portion of the container.

53. The device of claim 37, wherein said container has a bottom wall and the lower ends of the first and second inner tubes are fitted with means for connecting said first and second inner tubes through said bottom wall.

54. The device of claim 53, wherein said means for connecting includes a male adapter fitting coupled to the lower end of each of said first and second inner tubes, a bulkhead fitting coupled to said adapter fitting on an inside surface of said bottom wall, and a bulkhead nut threaded to the bulkhead fitting on an outer surface of said bottom wall.

55. The device of claim 37, wherein said container is an aquarium and said external system is a filtration device.

* * * * *